United States Patent
Capehart

(10) Patent No.: US 8,919,573 B2
(45) Date of Patent: Dec. 30, 2014

(54) WATER PURIFICATION SYSTEM AND METHOD

(76) Inventor: David Capehart, Denton, TX (US)

( * ) Notice: Subject to any disclaimer, the term of this patent is extended or adjusted under 35 U.S.C. 154(b) by 1399 days.

(21) Appl. No.: 12/258,038

(22) Filed: Oct. 24, 2008

(65) Prior Publication Data

US 2009/0107917 A1   Apr. 30, 2009

Related U.S. Application Data

(60) Provisional application No. 60/982,602, filed on Oct. 25, 2007.

(51) Int. Cl.

| | | |
|---|---|---|
| *B01D 17/038* | (2006.01) | |
| *B01D 21/26* | (2006.01) | |
| *B01D 36/02* | (2006.01) | |
| *C02F 9/00* | (2006.01) | |
| *B01D 61/16* | (2006.01) | |
| *B01D 17/02* | (2006.01) | |
| *B01D 36/04* | (2006.01) | |
| *C02F 1/28* | (2006.01) | |
| *C02F 1/38* | (2006.01) | |
| *C02F 1/44* | (2006.01) | |
| *C02F 1/76* | (2006.01) | |
| *C02F 1/78* | (2006.01) | |
| *C02F 103/08* | (2006.01) | |

(52) U.S. Cl.
CPC . *C02F 9/00* (2013.01); *B01D 21/26* (2013.01); *B01D 17/0217* (2013.01); *B01D 36/045* (2013.01); *C02F 1/283* (2013.01); *C02F 1/38* (2013.01); *C02F 1/441* (2013.01); *C02F 1/76* (2013.01); *C02F 1/78* (2013.01); *C02F 2103/08* (2013.01)

USPC ............... 210/512.1; 210/360.1; 210/314; 210/787; 210/639; 494/36

(58) Field of Classification Search
CPC .... B01D 17/0217; B01D 21/26; B01D 36/02; B01D 36/045; B01D 61/022; B01D 61/58; B01D 2015/00; B01D 2015/08; B01D 2311/2634; B01D 2311/2626; B01D 2311/2676; B01D 2311/2649; B01D 2317/02; B01D 2317/025; B01D 23/14; B01D 29/0052
USPC ........ 210/380.1, 512.1, 787, 788, 800, 360.1; 494/36

See application file for complete search history.

(56) References Cited

U.S. PATENT DOCUMENTS

| | | |
|---|---|---|
| 5,547,584 A | 8/1996 | Capehart |
| 5,547,644 A | 8/1996 | Taylor et al. |

(Continued)

OTHER PUBLICATIONS

Kimball, P. Palmer, Picking the Best Filter, 2002, available at <http://www.valveandfilter.com/choose-filter.htm>,accessed May 21, 2011.*

*Primary Examiner* — Katherine Zalasky
(74) *Attorney, Agent, or Firm* — Howison & Arnott, LLP

(57) ABSTRACT

A system for purifying non-potable water to make said water potable includes an intake pump for bringing the non-potable water into the system. At least one centrifugal separator separates the non-potable water into suspended solids, saline water and oil. At least one ozone contact chamber injects ozone into a water stream being injected into at least one of the at least one of the centrifugal separators. A series of progressive filtration components are used for progressively filtering the saline water from the at least one centrifugal separator. The salinization filters then desalinate the progressively filtered saline water.

9 Claims, 9 Drawing Sheets

(56) References Cited

U.S. PATENT DOCUMENTS 6,824,695 B2 * 11/2004 Tempest, Jr. .................. 210/760
2002/0166823 A1 * 11/2002 Mukhopadhyay ............ 210/806
2007/0056913 A1 * 3/2007 Burt .............................. 210/721
2007/0102359 A1 * 5/2007 Lombardi et al. ............ 210/639

* cited by examiner

WATER PURIFICATION SYSTEM AND METHOD

CROSS-REFERENCE TO RELATED APPLICATIONS

This application claims the benefit U.S. Provisional Application Ser. No. 60/982,602, filed on Oct. 25, 2007, and entitled "WATER TREATMENT SYSTEM", the specification of which is incorporated herein by reference.

TECHNICAL FIELD

The invention relates to systems and methods for purification of water, and more particularly, to a self-contained water purification system using separators for separating material from ozone-infused water.

BACKGROUND

Water covers more than two-thirds of the earth's surface. Nevertheless, there are many areas throughout the earth where water is scarce or where water, even if available, is not potable. Potable water is water that is suitable for humans and animals to drink and which meets minimum quality standards that may apply.

A great amount of the water on earth is brackish or sea water. Brackish and sea waters are typically not suitable for human and animal consumption because the waters contain salts and sediments which may be harmful. In addition, brackish and sea waters are often unsuitable for other desired uses.

In addition to brackish and sea water, so-called "fresh" water may also be unsuitable for use in certain circumstances. "Fresh" water may be unsuitable if it is polluted or contains certain bacteria or other microorganisms. For these and other reasons, waters found in many locations are not suitable for drinking or other desired uses.

As is generally known, water may be found in pools at the earth's surface or within the subsurface strata.

Surface water may be contaminated by events occurring at the surface. Subsurface water may be polluted by substances seeping through the earth's strata to enter formations containing the water. In any event, both surface water and water obtained from subsurface strata may require treatment prior to consumption and other use by humans and animals.

A number of water treatment systems and methods have been previously developed. Those water treatment systems and methods have sought to treat waters, either surface or subsurface, to make the waters potable. For treatment of large amounts of water, such as to supply cities and towns, large-scale water treatment facilities are generally necessary. These facilities typically include numerous tanks, large pumps, filtration apparatus, and chemical treating facilities. For smaller-scale water treatment, a variety of apparatus and methods are known. Those apparatus and methods typically include combinations of filters for filtration and chemicals for chemical treatment.

There have been earlier attempts to develop a transportable, self-contained water purification system capable of treating and supplying significantly large quantities of potable water. Those prior systems and methods have not been satisfactory, however, for many water treatment applications. For example, some of the systems and methods have been designed to treat only so-called "fresh" water. Those systems have generally treated the "fresh" water by filtration and addition of chemical disinfectants. The filtration serves to remove particulate matters from the water and the chemical disinfectants serve to render the water microbiologically suitable. Those systems and methods for treating "fresh" water typically have not served to remove dissolved substances in the water, for example, salts, which are found in brackish and sea waters.

Attempts have previously been made to develop transportable, self-contained water purification systems and methods for treating brackish and sea water and other waters containing dissolved substances. Those attempts have employed various chemicals and filter processes to prepare the water for a separate treatment process known as reverse osmosis. Reverse osmosis is the separation of solutes from a solution by causing the solvent to float through a membrane at pressures higher than the normal osmotic pressure. This is possible because of the phenomenon of osmosis. In osmosis, a solvent diffuses through a semi-permeable membrane from an area of greater osmotic pressure (i.e., greater concentration of dissolved substance) to an area of lower osmotic pressure (i.e., lesser concentration of dissolved substance). In reverse osmosis, the solvent diffuses through a membrane filter leaving dissolved substances, such as salts and other contaminants, behind.

Those prior technology water treatment systems and methods employing reverse osmosis have several limitations. For instance, those systems and methods have had limited throughput capacity and limited range of treatable input water quality. In addition, those systems and methods have required input of various consumable chemicals and apparatus to the systems and methods, as well as consumable resources for power generation, such as petroleum fuel. Often, these inputs are relatively quickly consumed by the systems and methods during operation and must be continuously or regularly added.

Even further, certain of those prior systems and methods employing reverse osmosis have been limited by requiring particular care in operations because toxic by-products are generated. Those toxic by-products, once generated in the operations, are not easily removed from the systems. Even if removed, those by-products present handling and disposal problems. As can be readily understood and appreciated, a system and method for water treatment which overcomes the limitations and problems of the prior technology and which is also transportable and self-contained would be a significant advantage in the art.

More particularly with respect to toxic by-product generation by the prior systems and methods, the prior technology portable water purification units have employed chlorine for pre- and post-oxidation/disinfection. The use of chlorine as a pre-oxidant (i.e., employed prior to filtration) causes formation of trihalomethanes, which are known carcinogens. Once formed, trihalomethanes are very difficult to remove from water being treated. Prevention of trihalomethane formation, rather than removal, then, is most desirable.

In the prior technology, ozone has sometimes been employed, rather than chlorine, as a pre-oxidant to avoid the problem of trihalomethane formation. Ozone use does not result in trihalomethane formation, but large concentrations of ozone are necessary to accomplish the intense oxidation necessary for water treatment. These large concentrations of ozone cannot be generated by the typical systems and methods, so it has been necessary to supply ozone to those systems and methods from an external source. Ozone availability can be limited or non-existent in many locales.

Also more particularly with respect to external resources required by the prior systems and methods, the prior transportable water purification systems and methods have typically used small, disposable cartridge filters for removal of particulates in the water being treated. Those filters have generally been capable of removing only particulates down to particular sizes for which the filter was designed. In use, filters designed for removal of only larger particulates may be used longer than filters designed for removal of smaller particulates. This is the case because filters designed for removal of larger particulates allow many small particles to pass and the filters do not quickly become clogged. On the other hand, filters designed for removal of smaller particulates pass fewer particles, thus, retaining more. The filters designed for removal of smaller particulates, therefore, tend to have short life-spans, becoming clogged quickly because of the greater number of particulates filtered by those filters from water being treated. Typically, the prior technology filters have been disposed of after use and have not been cleanable and reusable.

Further regarding filters of the prior technology transportable water treatment systems and methods, those systems and methods have in rare instances employed granular activated carbon filter media (GAC). Those that have employed GAC have been small cartridge-style filters. Those filters have not been cleanable and were necessarily disposed of and replaced after a period of use. Further in the prior art systems and methods, much of the adsorptive capacity of GAC filters, when employed, has been spent in removal of chlorine pre-oxidizer, rather than removal of matter from water being treated.

There are at least two known prior technology transportable systems for water purification on a significant scale. One of those systems, referred to in the trade as the "global water system LS3," has the disadvantage of not being useable in treating water containing high total dissolved solids (TDS) (e.g., brackish and sea waters contain high TDS). In addition, that system uses chlorine as a pre-oxidant, thus, resulting in trihalomethane formation and ensuing problems therewith. Further in that system, manual adjustment of chlorine dosage is required this gives variable treatment results and may be subject to human error. That system further includes only a single, non-reusable filter train which must be periodically replaced, and the replacement requires shutdown of the entire system.

The second known, prior technology portable water purification system is used by the U.S. Army and is called the "ROWPU" (for reverse osmosis water purification unit). This system requires addition of a coagulant aid for aiding removal of fine particles and colloids. This coagulant aid is consumed in the system and so must be continuously, or at least regularly, added to the system by an operator. The operator's involvement may lead to variable results, and there is the possibility of human error. Even further, the system requires addition of a scale inhibitor that is also consumed by the system. The system includes a single-stage cartridge filter that is non-reusable. The filter is not satisfactory for many applications, as it will pass viruses, giardia, cryptosporidium, and other bacteria. The system further employs reverse osmosis membranes that foul and must be replaced, and requires addition of residual disinfectant that is consumable and must be added or generated at the system site.

There is another source of water, often referred to as "produced water" or "connate water" that is an undesirable by-product of the harvesting or production of crude oil and natural gas from wells. This water is deemed undesirable for a multitude of reasons. The water is very high in dissolved salts and minerals, has high quantities of petroleum products entrained or dissolved therein, and is often contaminated by various micro-biological life forms. Each of these factors, individually or collectively, render the water generally unfit for human consumption or other beneficial uses, and represent challenges even when contemplating disposal of the produced water.

A number of water treatments systems and methods have been previously developed. These water treatment systems and methods had sought to treat waters, either surface or subsurface, to make the water potable. For treatment of large amounts, such as supplies to cities and towns, large scale water treatment facilities are generally necessary. These facilities typically include numerous tanks, large pumps, filtration apparatus and chemical treating facilities.

For smaller scale water treatment, a variety of apparatus and methods are known. These apparatus and methods typically include combinations of filters for filtration and chemicals for chemical treatment. Most of these systems and methods for treating "fresh water" typically have not served to remove bulk crude oil or dissolved substances in the water, for example, salts, which are found in brackish water, sea water, and produced water.

The present invention overcomes the problems of the prior technology water treatment systems and methods and, particularly, the transportable systems and methods previously available. In addition to overcoming the problems of the prior technology systems and methods, the present invention provides numerous additional features not found in the prior technology and improvements over a number of aspects of the prior technology. As will be understood and appreciated by those skilled in the art, the invention is a significant improvement in the technology and provides the herein described advantages and improvements, and many others.

SUMMARY

The present invention, as disclosed and described herein, in one aspect thereof, comprises a system for purifying non-potable water to make said water potable. The system includes an intake pump for bringing non-potable water into the system. At least one centrifugal separator separates the non-potable water into suspended solids, saline water and oil. At least one ozone contact chamber injects ozone into the water stream being injected into at least one of the at least one centrifugal separators. A series of progressive filtration components progressively filter the saline water from the at least one centrifugal separator. Desalinization filters then desalinate the progressively filtered saline water.

BRIEF DESCRIPTION OF THE DRAWINGS

For a more complete understanding, reference is now made to the following description taken in conjunction with the accompanying Drawings in which.

DETAILED DESCRIPTION

Figure 1:
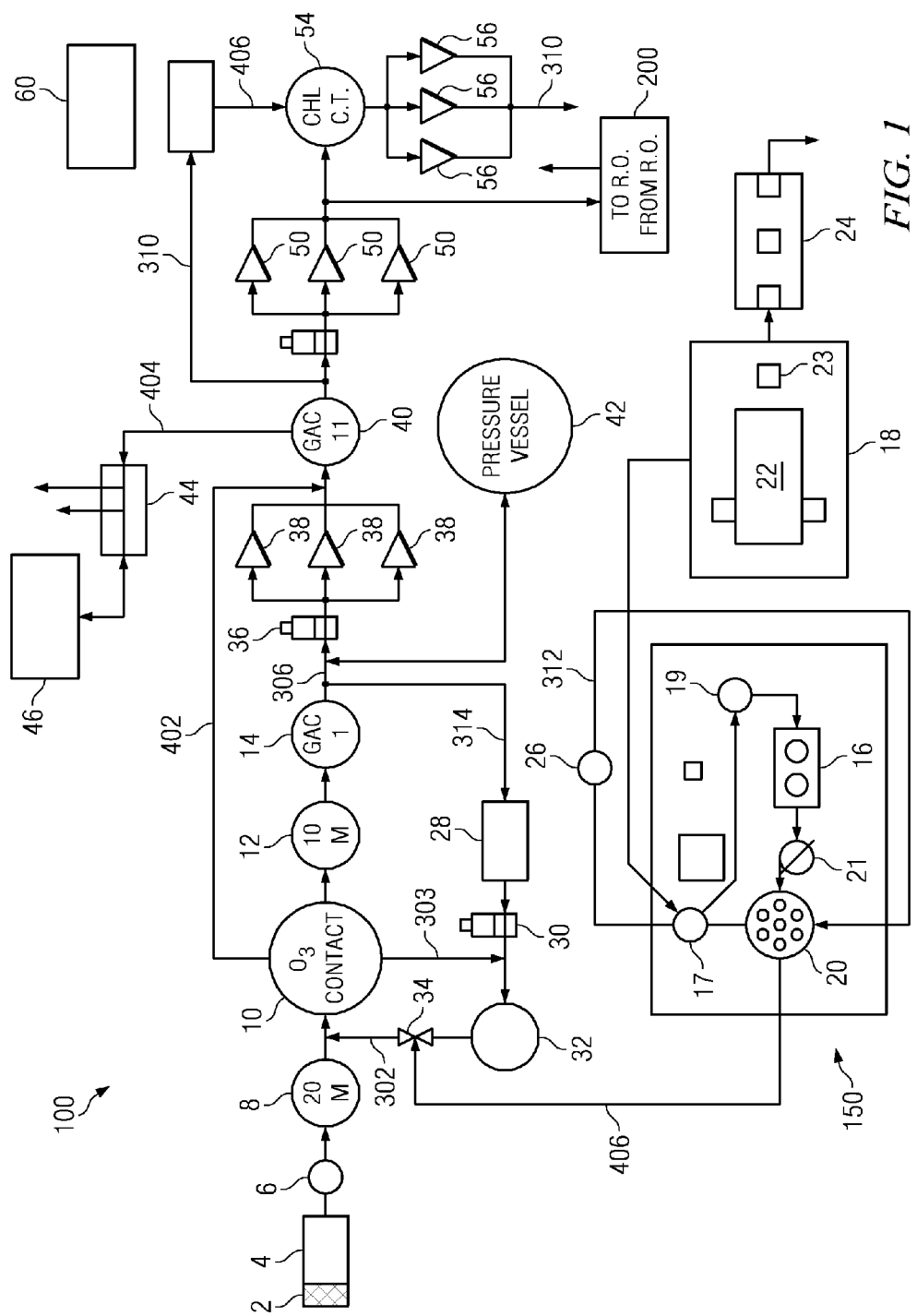
FIG. 1 is a simplified, illustrative, flow diagram of the unit of the present invention.

Referring now to the drawings, wherein like reference numbers are used herein to designate like elements throughout, the various views and embodiments of the water treatment system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The present invention is, in one embodiment, a system and method for water treatment that is substantially self-contained and transportable. The system and method overcome the problems of the prior technology. Other improvements and advantages are also realized.

Generally, the invention embodiment includes a bactericidal unit comprising ozone pre-treatment prior to a reverse osmosis (desalination) process. The bactericidal unit includes various steps of filtration, certain of which are by granular activated carbon beds (GAC). Water treated by the bactericidal unit is fed to a desalination unit which, in the invention embodiment, includes steps of filtration and reverse osmosis. The bactericidal unit also includes a chlorine treatment step for water disinfection. Due to the particular apparatus and method steps, the invention embodiment provides for reusable filters, limited manpower involvement in most instances, no formations of toxins, such as trihalomethanes, and long periods of continuous operation without the necessity of shut-down or supply of extraneous substances and equipment.

Referring first to FIG. 1, a simplified, illustrative flow-diagram of the bactericidal unit 100 of a preferred embodiment of the invention is depicted. This system similar to that described in corresponding U.S. Pat. No. 5,547,584 issued Aug. 20, 1996, which is incorporated herein by reference with improvements relating to the centrifugal separator. Water to be treated first enters the invention apparatus through a strainer 2. The strainer 2 is preferably suitable to strain particles ⅜" and larger from the water as it enters the unit 100. After the strainer 2, the water passes to a foot valve 4. The foot valve 4 prevents backflow or loss of prime at the unit 100 inlet. As will be hereinafter more fully discussed, the invention apparatus is electronically controlled to allow for optimum operation, including with the first water fed to the system for treatment. The foot valve 4 serves to limit flow of water to the system until all system features are ready to begin treatment. Although other valves and strainers may be employed, in a preferred embodiment, the foot valve 4 is a Teel, Brady Model SFV-150, 1½" NPT size (Stock No. 2A649) and the strainer 2 is that supplied with the foot valve 4.

Still referring to FIG. 1, in the invention embodiment, water for treatment is caused to flow through the system apparatus by an intake pump 6. This intake pump 6 is located after the strainer 2 and foot valve 4 along the flow of the intake water. A variety of intake pumps may be employed, however, the intake pump 6 is preferably a centrifugal pump driven by an electric motor. Even more preferably, the intake pump 6 is a Challenger™ High Head High Performance ½ hp pump distributed by PAC-FAB of Sanford, N.C. The electric motor driving the intake pump 6, in the preferred arrangement, is powered by a gas-powered electric generator, more preferably a 13 hp 9000 watt peak power 220 single-phase generator Model 3W739 distributed by Dayton Electric Manufacturing Company of Chicago, Ill. (not shown in detail). This electric generator supplies all electrical power utilized by the invention embodiment in operation. Other electric generators or sources of electric power may alternatively be employed.

Continuing to refer to FIG. 1, the water being treated by the invention embodiment flows from the intake pump 6 to a cartridge filter 8. The cartridge filter 8 may be any type of filter capable of removing particles from water, however, the cartridge filter 8 is preferably a 25μ filter of the type distributed by Sta-Rite Industries, Inc. of Waterford, Wis., and referred to as POSI*FLO® II FILTER Model PTM70. The preferred cartridge filter 8, as well as any other type filter, employed in the system, will be removable and cleanable and, then, reusable in the system. Removal of the cartridge filter 8 (and cartridge filter 12 hereinafter discussed) from the unit 100 and cleaning and replacement thereof can be accomplished during regular scheduled maintenance shut-down intervals for the unit 100 operations (e.g., 25 hour intervals). Other filters of the unit 100 (e.g., filters 38, 50, 56 hereinafter more fully discussed) may be cleaned and/or replaced without shut-down of the unit 100 operations due to the capability of shutting-off portions of the unit 100 while maintaining water circulation in the rest of the unit 100.

Further referring to FIG. 1, it is notable that, though the cartridge filter 8 (and cartridge filter 12 as hereinafter discussed) of the unit 100 may be removed and cleaned, cleaning will typically not be necessary more often than at regular service intervals for the unit 100. Those filters which may require more frequent cleaning (e.g., filters 38, 50, 56 hereinafter discussed) have been arranged in parallel arrays with other filters, allowing shut-down of one filter of the array at a time for cleaning without shut-down of the entire unit 100. It is also notable that the filters employed in the unit 100 and, in particular, the preferred filters, are not necessarily intended to be cleanable and reusable. Because such filters are useable with the unit 100, filter costs for the unit 100 are reduced. In order to allow for filter cleaning, the unit 100 may be equipped with an ultrasonic cleaning apparatus (not shown in detail), preferably a Genesis™ model ultrasonic cleaner available from Crest Company. Electrical power for operating the ultrasonic cleaning apparatus may be provided by the electrical generator of the unit 100.

Still referring to FIG. 1, water having passed through the cartridge filter 8 is, in the embodiment, fed to an ozone contact chamber 10. Note that a recirculated portion 302 of the water being treated mixes with the water passing from the cartridge filter 8 prior to entry into the ozone contact chamber 10. This combined water, as will be hereinafter more fully explained, includes ozone ($O_3$) and enters the ozone contact chamber 10 where pre-oxidation and disinfection occurs. The ozone contact chamber 10 may be any vessel suitable for containing ozone and the water for contact. Preferably, however, the ozone contact chamber 10 is a vessel, Model HRPB30, obtained from the previously mentioned Sta-Rite Industries, Inc. In the ozone contact chamber 10, the ozone contacts with the water being treated. This contacting of ozone with the water disinfects the water by destroying parasites and bacteria and inactivating viruses. The contacting also oxidizes organic substances in the water to convert them to a more readily biodegradable form. Even further, the contacting of ozone with the water causes coagulation of colloids in the water so that the colloids may be removed by filtration. In the preferred embodiment, ozone is contacted with water in amounts of at least about 0.2 ppm for four minutes of contact time. The oxidation reduction potential (ORP) of the water being contacted by ozone is monitored as hereinafter detailed. As also hereinafter more fully described, ozone is preferably generated on-board the unit 100 by an ozone generation unit 150 and the ozone supply is controlled to maintain the ORP at a desired level to obtain desired output water from the system.

Still referring to FIG. 1, in the invention embodiment, after the water is contacted with ozone in the ozone contact chamber 10 in quantities and for periods of time previously described, the water flows through another cartridge filter 12. This cartridge filter 12 may also be any filter suitable for filtering particulates from water. This cartridge filter 12 is preferably, however, a 10μ filter, and more preferably a 10μ BETAPURE® Filter Cartridge contained in a CUNO TYPE DC cartridge filter housing, each available from CUNO Inc., Meriden, Conn. Tests with the preferred embodiment of the invention have shown that bacterial reduction from 1.1 billion colony forming units (CFU) to 10 CFU is obtained by the previously stated dosage and retention of ozone combined with filtration by the 10μ cartridge filter 12.

Continuing to refer to FIG. 1, in the embodiment of the invention, water output from the cartridge filter 12 is mixed with recirculated water (not shown in detail in FIG. 1, but recirculated from a second GAC 40 hereinafter discussed) from ozone generation and fed to a first granular activated carbon filter (GAC) 14. This first GAC 14 is preferably a STA-RITE® System 3 high rate sand filter vessel, Model S8S70 from Sta-Rite Industries, Inc., which vessel contains granular activated carbon. The granular activated carbon is preferably acid washed, 12/40 mesh 92%, 8% 12/30 roasted coconut shells which may be obtained from Calgon Corporation. Other vessels and granular activated carbon can be employed. At the first GAC 14, the water fed to the GAC 14 is passed over a granular activated carbon bed, preferably in a manner giving an empty bed contact time of four minutes. The granular activated carbon of the GAC 14 initially adsorbs organics in the water and, as the granular activated carbon is in sustained use, colonies of aerobic microorganisms grow thereon which allows also for biodegradation of organics. In this step, therefore, total organic carbons and volatile organic carbons are 20 adsorbed onto the granular activated carbon media of the first GAC 14, and, once microorganism colonies grow thereon, the media serves also to degrade the organic carbons. Still referring to FIG. 1, in the embodiment, water exiting the first GAC 14 is separated into two flows 306, 314. A portion of the water 314 recirculates to join with water 302 entering the ozone contact chamber 10. The flow of this portion of the water 314 will later be described in more detail in conjunction with the description of the recirculation of water of the system and the ozone generation unit 150 of the system.

Further referring to FIG. 1, the other portion of the water 306, in the embodiment, exiting the first GAC 14 continues flowing through the unit 100. At this location along the water 306 flow path, a pressure vessel 42 serves as a water storage facility to allow the intake pump 6 to cycle without water hammer. The pressure vessel 42 prevents water hammer by maintaining appropriate flow levels in the unit 100 when water is being recirculated. Maintaining appropriate pressure and flow throughout the unit 100 is important in order to prevent undesirable flow effects. As will be hereinafter more completely described, the pressure vessel 42 operates in conjunction with a ball valve 36 and a water pressure regulator 48, each upstream from the location of the pressure vessel 42. Preferably, the pressure vessel 42 is a precharged water well tank, Model 4P835, distributed by the previously mentioned Dayton Electric Manufacturing Company, however, other pressure vessels can be employed.

Continuing to refer to FIG. 1, the ball valve 36 is located upstream from the pressure vessel 42 in the embodiment. The ball valve 36 is preferably electrically actuated to allow for automated control of water flow and pressure levels in the unit 100. Although other valves may be used, a preferred ball valve 36 is the Asahi America Electromni Low-Cost 1" electrically activated ball valve.

Still referring to FIG. 1, after passing through the ball valve 36 in the invention embodiment, the water being treated flows through another set of cartridge filters 38. In the preferred arrangement, the cartridge filters are a set of 5μ cartridge filters. More preferably, three 5μ filters are employed in flow parallel. Preferred cartridge filters 38 employed in the parallel array are BETAPURE® 5μ filter cartridges contained in CUNO Model 1M2 industrial filter housings, each available from CUNO Inc., previously mentioned. At this point in the flow of the water, the cartridge filters 38 remove additional particles from the water. Other filters, suitable to remove particulates from the water, could be employed as the cartridge filter 38.

Continuing to refer to FIG. 1, in the embodiment, water flowing from the cartridge filters 38 is mixed with ozone off-gas 402 from the ozone contact chamber 10. The ozone off-gas 402 contacts with the water from the cartridge filters 38 and flows along with the water into a second granular activated carbon filter 40. This second GAC 40 is preferably of the same specifications as the first GAC 14, including the granular activated carbon media, even though alternatives are also possible here. At this second GAC 40, the water passes over the granular activated carbon bed of the second GAC 40 for removal of additional total organic carbons and volatile organic carbons which are adsorbed on the granular activated carbon media. The ozone off-gas 402 mixed with the water prior to entry to the second GAC 40 is useful in extending the life of the granular activated carbon media of the second GAC 40. The ozone off-gas 402 oxidizes materials that are adsorbed onto the granular activated carbon, performing an ongoing rejuvenation of the granular activated carbon media of the second GAC 40. The ozone off-gas 402 after passing with the water over the granular activated carbon is then collected from within the second GAC 40 and directed as an off-gas 404 for destruction.

Still referring to FIG. 1, in the invention embodiment, water flowing from the second GAC 40 flows to a water pressure regulator 48 which, as previously mentioned, serves in conjunction with the water pressure vessel 42 and ball valve 36 to maintain appropriate water and pressure levels at previous water flow locations of the unit 100. The pressure regulator 48 preferably serves to maintain a pressure in the range of from about 20 psi to about 40 psi at the downstream portions of the unit 100. Preferably, the water pressure regulator 48 is a PLAST-O-MATIC™ Style B, Series RVT, 1½" (Size No. 15), Model 4526-0, PVC, Viton trim valve, although other means of pressure regulation may be employed.

Further still referring to FIG. 1, a portion of the water 310 exiting the second GAC 40 flows to a chlorine generation unit 58 in the embodiment. The chlorine generation unit 58 preferably comprises a chemical solution tank with float valve level regulator, a chlorine cell, a DC power supply, a saltwater sump pump, and a peristaltic chlorine dosing pump (not detailed in FIG. 1). The portion of the water 310 flows to the chemical solution tank wherein the level is regulated by the float valve level regulator. The chlorine cell is powered by the DC power supply. The salt water sump pump circulates the water 310 across the chlorine cell. The chlorine cell generates liquid chlorine (i.e., Sodium Hypochlorite) from the water according to the formula:

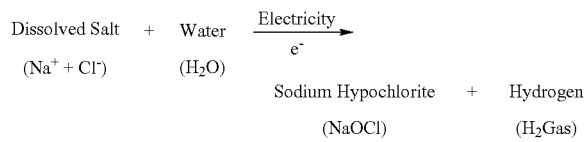

The liquid chlorine is fed from the chlorine generation unit 58 via the peristaltic chlorine dosing pump. In a preferred embodiment, the chemical solution tank is a Mec-O-Matic brand No. 2P307 available from Dayton Electric Manufacturing Company, previously mentioned. The tank is equipped with a liquid level monitor to check the liquid level in the tank without opening the lid. The monitor operates with a float valve, preferably a 3 GPM Watts Regulator model also available from Dayton Electric Manufacturing Company, to regulate liquid level in the tank. The chlorine cell is preferably a LECTRANATOR® automatic chlorine system available from Lectranator of Fort Lauderdale, Fla. The DC power supply of the chlorine system provides 5.5 Amps, 230 VDC, Maximum with power in of 115 VAC, 50/60 Hz, 2.5 Amps or 23 VAC, 50/60 Hz, 1.3 Amps. The saltwater sump pump employed is preferably an epoxy-encapsulated magnetic driven saltwater pump, Model No. 2P875 available from Dayton Electric Manufacturing Company. The peristaltic chlorine dosing pump is preferably a Mec-0-Matic brand multi-purpose peristaltic pump, Model No. 2P305, also available from Dayton Electric Manufacturing Company. Alternative means for chlorine generation may also be employed.

Continuing to refer to FIG. 1, in the embodiment, water passing from the water pressure regulator 48 enters another set of cartridge filters 50, preferably three 5μ cartridge filters in flow parallel. The preferred cartridge filters 50 more preferably meet the same specifications as those previously described with respect to the description of cartridge filters 38. Other filtering mechanisms could be employed. If desired for further water treatment, water may be flowed through an optional reverse osmosis unit 52 prior to proceeding to a chlorine contact chamber 54. The optional reverse osmosis unit 52 will later be discussed in particular detail.

Still referring to FIG. 1, after flowing through the set of cartridge filters 50 (and the reverse osmosis unit 52, if present) the water being treated flows to a chlorine contact chamber 54 in the embodiment. The chlorine contact chamber 54 is preferably a STA-RITE® System 3 High Rate Sand Filter vessel, Model S8S70, available from Sta-Rite Industries, Inc., previously mentioned. Nevertheless, other suitable contacting equipment could be employed. At the chlorine contact chamber 54, the water is contacted with liquid chlorine 406. The chlorine 406 allows for final disinfection of the water. In the chlorine contact chamber 54, the ORP level of the water is monitored. Chlorine 406 slurry is added by the peristaltic chlorine dosing pump to maintain a chlorine residual in the water being dispensed. In the preferred embodiment, the water is mixed with chlorine for four minutes contact time and then dispensed. Further in the preferred embodiment, the chlorine contact chamber 54 is maintained at an operating pressure ranging from about 5 psi to about 40 psi.

Further referring to FIG. 1, it is of note that, as described in connection with the above discussion of the prior technology, chlorine and humic waste combine to form trihalomethanes, proven carcinogens. Most mobile water treatment systems of the prior technology add chlorine much earlier in the treatment process. The result is formation of trihalomethanes. Once formed, trihalomethanes are extremely difficult to remove from water. In the embodiment of the invention system and method, all humic materials are cleaned from the water before adding chlorine (i.e., by using the $O_3$ contact, granular activated carbon filtration, and conventional filtration), thereby preventing formation of trihalomethanes upon addition of chlorine to the water at the step of contacting the water with chlorine in the chlorine contact chamber 54.

Further referring to FIG. 1, in the embodiment, treated water exiting the chlorine contact chamber 54 is passed to another set of cartridge filters 56. This set of cartridge filters 56, like all the others, can be any suitable mechanism; however, it is preferably three 1μ cartridge filters in parallel flow. More preferably, these filters are BETAPURE® 1μ filter cartridges housed in CUNO Model 1M1 or 1M2 industrial filter housings, each available from CUNO Inc., previously mentioned. At the treated water 310 outlet of the unit 100, the treated water may be measured and tested. In the preferred embodiment, the treated water passes through a flow rotameter, preferably a 7830/7330 Series Free Standing Flowmeter distributed by King Instrument Company of the Huntington Beach, Calif. The treated water also preferably is tested for conductivity, pH, and ORP levels, more preferably by means of an ASI Conductivity Cell Part Number CT121008-10-T a Hard Bulb pH Electrode, and an ORP Electrode, each available from Analytical Sensors, Inc. The treated water exiting the unit 100 can also be regulated, preferably by a Hi-Temp Steam Solenoid Valve Model 2A199 available from Dayton Electric Manufacturing Company, although other suitable regulating means could be employed. Treated water 310 exiting the cartridge filters 56 can meet World Health Organization requirements for biological efficacy of potable water and can satisfy innumerable other standards which may apply in any particular instance.

Even further referring to FIG. 1, as previously mentioned, in the embodiment, the water splits after the first GAC 14 with a portion of the water 314 flowing to recirculate. The portion of the water recirculated is flowed in path 314. The recirculated water 314 preferably flows through a check valve 28 which serves to prevent back-flow of the untreated water of the recirculated stream. The check valve 28 is preferably a Viton 1" low cost PVC check valve. The water 314 flowing through the check valve 28 for recirculation also preferably flows through a solenoid valve 30 that allows control of the recycle stream 314, as desired, to achieve appropriate mixing of the recirculated portion 302 at the inlet of the ozone contact chamber 10. The solenoid valve 30 is preferably a ¾" brass Hi-Temp Steam solenoid valve, Dayton Model 2A199, operated with a solenoid coil, Dayton Model 6X543, and a liquid level control, Madison Model M8000. Alternative equipment could be employed as check valve 28 and solenoid valve 30. In the embodiment, the solenoid valve 30 is operated in conjunction with the recycle ball valve 36, previously described, to obtain an appropriate recirculation rate to yield a desired ORP level of water exiting the ozone contact chamber 10.

Still referring to FIG. 1, after flow through the solenoid valve 30, the recycle stream 314 is mixed with a recirculation stream 303 from the ozone contact chamber 10 in the invention embodiment. The mixed streams 303,314 flow to a venturi booster pump 32. The venturi booster pump 32 is preferably a POLARIS® Vac-Sweep pump, Model PB-4, available from Polaris of San Marcos, Calif., although other equipment could be employed. At the booster pump 32, ORP of the mixed streams 303,314 is sensed by an ORP sensing mechanism, preferably an ORP Electrode available from Analytical Sensors, Inc. of Houston, Tex. The ORP level sensed thereat is employed by the control system of the invention to regulate recycle by virtue of the solenoid valve 30 and ball valve 36.

Continuing to refer to FIG. 1, in the preferred embodiment of the invention, recirculated water 314 flow is regulated to obtain desired ORP levels at the booster pump 32 for mixed streams 303,314. In controlling the unit 100 in a preferred embodiment, an ORP level of 650 mV or greater is sought for treated water at the chlorine contact chamber 54. In the preferred embodiment, it is known that an ORP level of 200 mV or greater at the ozone contact chamber 10 will yield the desired ORP level of 650 mV or greater at the chlorine contact chamber 54. The preferred control arrangement for the unit 100 is to recirculate the entire water stream 314, as necessary, until a 200 mV or greater ORP level is sensed at the ozone contact chamber 10. When such an ORP level is sensed at the chamber 10, recirculation is discontinued. As hereinafter more fully discussed, the automated control of the preferred unit 100 achieves the desired recirculation described here.

Further referring to FIG. 1, in the invention embodiment, the venturi booster pump 32 pumps the mixed stream 303,314 to a venturi 34. At the venturi 34, ozone which has been generated by the on-board ozone generation unit 150 is mixed with the mixed streams 303,314 and fed via stream 302 to the inlet of the ozone contact chamber 10. The venturi 34 is preferably a Mazzei Injector, Model 1081, available from Mazzei Injector Corporation. Any mechanism which allows mixing of ozone with the mixed streams 303,314 may be employed as the venturi 34. At the inlet of the venturi 34, the mixed streams 303,314 preferably enter at a flow rate of about 10 GPM and a pressure of about 60 psi. The suction port of the venturi 34 sucks in ozone at a rate of preferably about 1 CFM under these operating conditions. The outlet stream from the venturi 34, which is water 302 for entering the ozone contact chamber 10, exits the venturi 34 preferably at a flow rate of about 10 GPM and a pressure of about 40 psi. Alternative flows and pressures may be suitable or appropriate.

Still referring to FIG. 1, in the embodiment, a closed-loop of water 312 flows to the ozone generation unit 150. The ozone generation unit 150 serves to generate ozone at the system site. The ozone generation unit 150 preferably consists of an ozone reaction chamber 20 in which ozone is generated from the ambient air of the particular environment where the invention is being employed. Other ozone generation means 150 maybe suitable. Ozone which has been generated at the ozone reaction chamber 20 mixes with mixed recycle and recirculation streams 303,314 at the venturi 34, as previously described. This serves to provide ozone to the ozone contact chamber 10 where the ozone is mixed with the water flowing to the inlet of the ozone contact chamber 10.

Continuing to refer to FIG. 1, in the embodiment, the ozone off-gas 402 from the ozone contact chamber 10, as previously mentioned with respect to the second GAC 40, again enters the water being treated prior to the second GAC 40. At this point, the entry of the ozone off-gas 402 serves to rejuvenate the granular activated carbon media in the second GAC 40 by oxidizing substances adsorbed onto the media. This rejuvenation effect obtains longer active life of the granular activated carbon media.

Further still referring to FIG. 1, in the invention embodiment, the ozone generation unit 150 is seen to include an air compressor tank 18 for storing air under pressure. The air compressor tank 18 is preferably a Stationary ASME Code Air Tank, 15 gal. or greater capacity, Dayton Model 5Z358, although others may be employed. The air is pressured by an air compressor 22, preferably a GAST Model SHCD-78-M500X, associated with the tank 18. The tank 18 is equipped with a condensate purge valve 24, preferably a SpeedAire Model No. 6Z948, for dispelling condensation from the system. The air compressor 22 is controlled by a pressure switch 23, preferably a Furnas Model No. 69MB6.

Still referring to FIG. 1, the outlet compressed air from the air compressor 22 preferably ranges from about 60 psi to about 100 psi. The compressed air from the air compressor tank 18 flows, preferably at a rate of about 1 CFM, to an air conditioning unit, including, for example, an air cooler apparatus 17, air drying apparatus 19, and coalescing apparatus 16, each associated with the ozone generation unit 150. Other flows and pressures may be suitable. Additionally, the air conditioning unit may consist of other equipment.

Still referring to FIG. 1, in the embodiment, the compressed air flowing to the ozone generation unit 150, after conditioning, regulation, and measurement, passes to the ozone reaction chamber 20 where the air is preferably at a pressure of from about 9 psi to about 12 psi. The ozone reaction chamber 20 is preferably operated at about 5,000 to 13,000 volts high voltage discharge across the air gap where the ozone is created. Other voltages may be suitable. Electricity is supplied to the ozone reaction chamber 20, for example, from a high voltage transformer, preferably an ORAM Model No. TU 1-13.5-1.1, that receives electricity from the gas-powered electric generator of the unit 100. The transformer may require a cooling fan, also operable by power from the unit 100 generator. The ozone reaction chamber 20, in the preferred embodiment, is a shell and tube bundle in which high voltage electrical discharge across an air gap causes oxygen to be converted to ozone. The shell provides a water cooling jacket around the ozone reaction chamber 20 within the tube bundle, so the reaction is very cool. Water is supplied to the cooling jacket via stream 312. Contact time of the water 312 within the ozone reaction chamber 20 is preferably about four minutes, although other contact times may be employed.

Continuing to refer to FIG. 1, at the air cooler apparatus 17 of the invention embodiment, the compressed air is cooled, preferably to a range of from about 60° F. to about 100° F. Although a variety of cooling apparatus and methods could be employed, the air cooler apparatus 17 is preferably a Water-Cooled Aftercooler, Model 5Z625 available from SpeedAire, previously mentioned, which Aftercooler is a small shell and tube exchanger. The air is cooled via the air cooler apparatus 17, for example, by water circulated in the apparatus 17 in the preferred embodiment. The water serving to circulate may be a closed-loop stream 312 of FIG. 1 which, as illustrated in FIG. 1, first flows through an ozone reaction chamber 20 as later herein discussed prior to flowing through the air cooler apparatus 17. A hydronic cooling pump 26 is preferably employed to circulate the stream 312, however, other equipment may be employed.

Further referring to FIG. 1, after passing through the air cooler apparatus 17, the air, in the invention embodiment, is passed to the particulate filter (not shown in detail in FIG. 1). The particulate filter removes particles and bulk moisture condensate. The air is then passed to an oil coalescing filter (not shown in detail in FIG. 1) where hydrocarbons to 0.01µ are removed. The air is then passed to the air drying apparatus 19, preferably a Heatless Desiccant Twin Tower Dryer, DE Series, Model DEO, available from Wilkerson Corporation, Englewood, Colo. A pressure switch (not shown) is preferably located between the air drying apparatus 19 and the air cooler apparatus. The pressure switch can serve to alarm the programmable logic controller (hereinafter discussed) in the event proper air pressure (e.g., 50 psi) is not available at the air drying apparatus 19. A preferred pressure switch is the Furnas Model 69WR5.

Further referring to FIG. 1, in the embodiment, the air passes from the air drying apparatus 19 to a coalescing apparatus 16. The coalescing apparatus 16 may take a variety of forms, however, the coalescing apparatus 16 is preferably a Compact Modular Coalescing Filter Model M16 equipped with a Filter Model F16B, each available from Wilkerson Corporation, previously mentioned. Air from the coalescing apparatus 16 is dried and cooled to preferably about a minus 60° F. dew point. This completes the air conditioning unit of the ozone generation unit 150. The air conditioning unit, as necessary, is equipped with electrical connections for receiving power generated by the gas-powered electric generator of the unit 100, previously described.

Continuing to refer to FIG. 1, after conditioning, the air to the ozone generation unit 150 travels to an ozone reaction chamber 20 in the invention embodiment. Prior to entering the ozone reaction chamber 20, the air may be subjected to certain steps, for example, regulation and measurements. In a preferred embodiment, the air is regulated and measured via an air control apparatus 21. The air control apparatus 21 may include, for example, an air filter and pressure regulator, a flow switch coupled with a delay timer, and an air flow rotameter. A preferred air filter and pressure regulator is the SpeedAire Model 2Z436A. The flow switch is preferably a Malema Model M-50/55 Series available from Malema Engineering Corporation of Pompano Beach, Fla. The associated delay timer is preferably a Dayton Model 5X830F Time Delay Relay. A preferred air flow rotameter is the RATE-MASTER® Flowmeter distributed by Dwyer Instruments, Inc. of Michigan City, Ind. All this equipment, to the extent necessary, is also powered by the gas-powered electric generator of the unit 100, as previously described.

Further referring to FIG. 1, in the invention embodiment, closed-loop water stream 312 passes through the ozone reaction chamber 20 and then on to pass through the air cooler apparatus 17. Between the chamber 20 and cooler apparatus 17, however, the water 312 may, as is preferable, pass through a restrictor orifice, cooling coils, cool water reservoir, cooling pump, water flow meter, and flow switch (all not shown). The restrictor orifice prevents backflow of water 312 flowing to the cooling coils. Preferred cooling coils may be obtained from SpeedAire Model No. 5Z757 or 5Z758. The cooling coils preferably cool the water 312, flowing at about 2 GPM at 20 psi, down to about 10° F. below ambient temperature. A cooling fan, for example, as is preferable, a Dayton Axial Fan Model 4C688, may be employed in connection with the cooling coils to obtain the desired water cooling effect. Cooled water from the cooling coils can be stored in the cool water reservoir. A cooling pump, for example, preferably a TEEL Model Z1015, may be employed to pump cooled water from the reservoir to the air cooler apparatus 17 to complete the cooling water 312 flow loop. Prior to reaching the air cooler apparatus 17, the pumped water 312 may pass through a water flow meter, preferably a RATEMASTER® Flowmeter Model RMC available from Dwyer Instruments, Inc., previously mentioned. The pumped water 312 also may pass through a corrosion-resistant flow switch, preferably a Poly-Pro Model 6952. Alternative and/or additional equipment may be employed.

Figures 2, 2A:
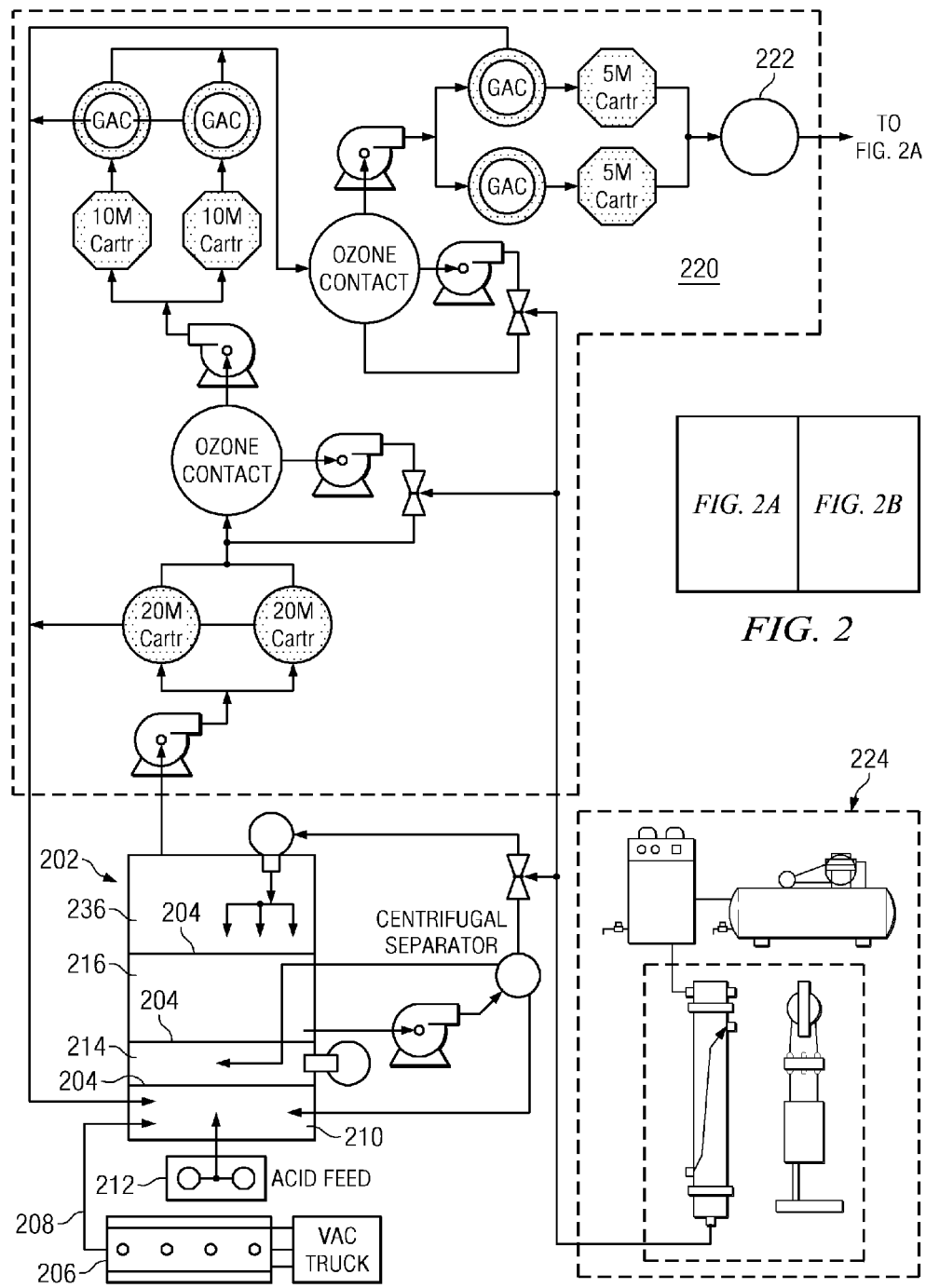
FIGS. 2a and 2b illustrate the components used within the water purification system illustrated with respect to FIG. 1.
Figure 2B:
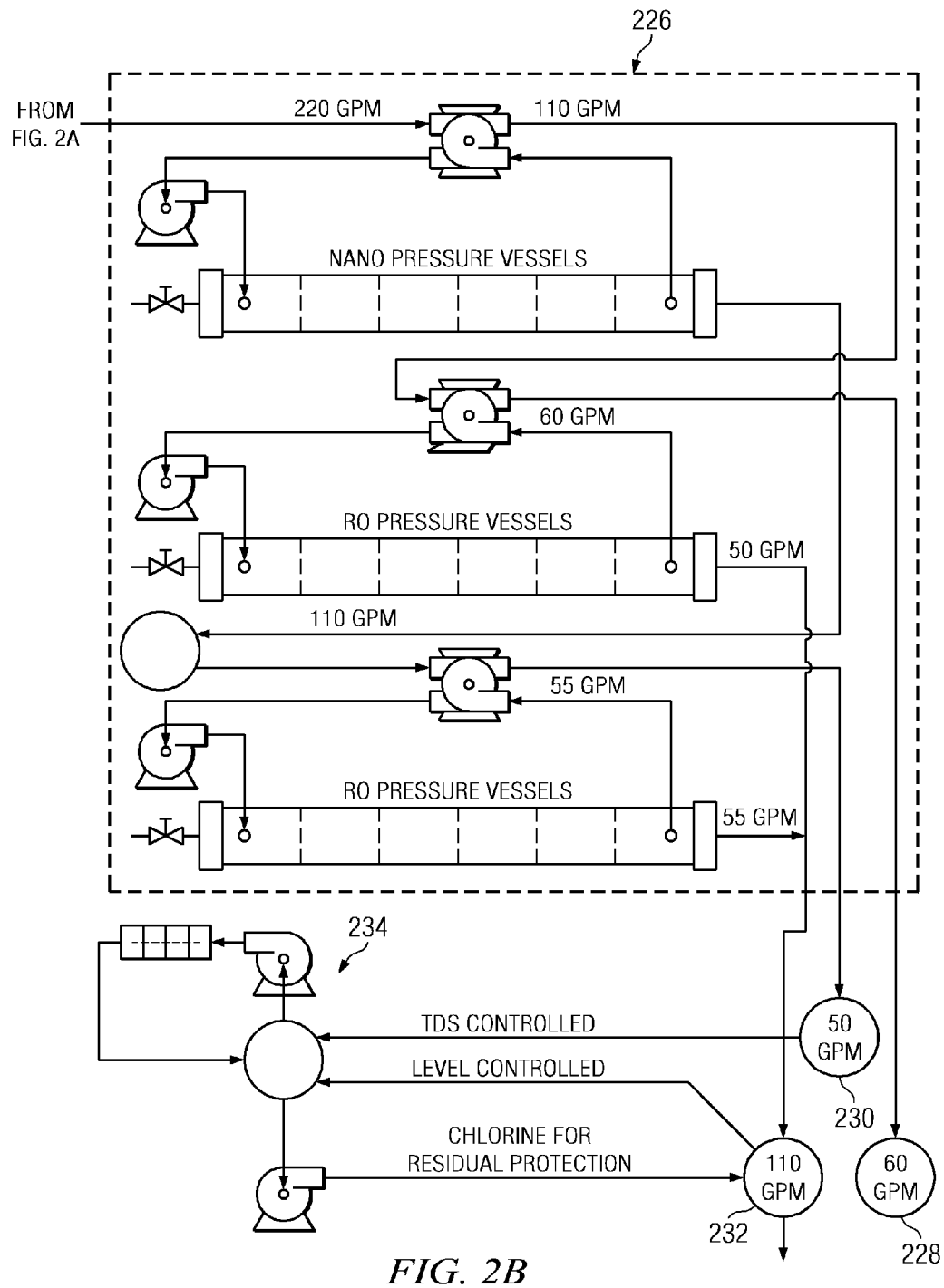

Referring now to FIGS. 2a-2b, there are provided an illustration of the various mechanical components comprising the water purification system described more generally with respect to FIG. 1. FIGS. 2a-2b illustrate the various components of the water purification system. The water, which may be treated by the system, may comprise ground water, fresh water, brackish water, sea water, or produced water. In particular, the system may be implemented by using ozone gas for enhancement of produced water in order to facilitate the recovery of emulsified oil and reused or provide efficient sustainable disposal of produced water by injection into salt water disposal wells.

If the water cannot be made potable, it may still have beneficial uses as a medium for blending solutions such, as fraccing fluids utilized in developing newly drilled oil wells and gas wells. Lack of sufficient quantity of suitable water often impairs the development of new fields, especially during times of drought.

There are two somewhat different methods used to transport produced water from oil and gas wells. Produced water is either piped from oil and gas well separation sites to salt water disposal facilities, or, alternatively, the produced water may be trucked in from the oil and gas well separation sites to the salt water disposal facility. The most common transport is a vacuum truck that carries up to 130 barrels of produced water. Some salt water disposal facilities receive two hundred or more trucks per day.

Salt water disposal facilities may be of two different types. An open pit facility receives produced water from the vacuum trucks which is placed into a pit and then into a "gun barrel". The gun barrel comprises a first tank in a series of six tanks known as a "tank battery." In a closed salt water disposal facility, produced water goes from the vacuum truck directly to the gun barrel without going through the pit. In an open pit transfer, vacuum trucks arrive at a drop-off point and open a valve to allow the produced water to flow from the vacuum truck into a pit. The pit usually has two or more weirs intended to assist in the collection of oil and in causing the removal of suspended solids. After passing through the pit, the produced water is pumped through a strainer and into the gun barrel (a large tank where the oil is siphoned off and where the suspended solids are intended to drop out of solution), and then into a series of storage tanks. The produced water moves from one tank to the other in series until it reaches the "down hole" tank. The produced water is then pumped down a disposal well to depths of eight to twelve thousand feet.

In a closed transfer operation, vacuum trucks pull up to the pumps that empty the trucks' contents straight into the gun barrel, where the same process as described hereinabove then takes place. Each of these methods is often somewhat impaired due to a phenomena that can be described as microbiologically enforced emulsification. Various characteristics of produced water allow anaerobic, aerobic, and facultative bacteria to thrive in the pit and in the tank battery. The oil and the mineral dissolved in the produced water are a source of nutrition for the various strains of microorganisms. The microorganism's consumption of the minerals and the oil results in a waste substance that is an emulsified colloidal biomatrix that has significant mass but little weight/density. The colloidal mass interferes with the harvesting of oil from the produced water before the water is disposed of "down hole." It also represents a threat to the permeability and, therefore, the long term viability of the "oil formation" that is intended to be the recipient of the produced water since suspended solids that should precipitate and fall to the lower regions of the tank are held in a state of suspended emulsification. Merely filtering the produced water as it is pumped from the pit to the gun barrel does not sufficiently remove the solids or prevent this phenomenon.

Waste products, such as hydrogen sulfide and dilute sulfuric acid, are secreted during the activities of sulfate reducing bacteria (SRB). The tank structures and piping materials are attacked by this sulfuric acid as well as the activity of iron reducing bacteria (IRB). This type of corrosion is known as microbiologically induced corrosion (MIC). The specialized high pressure pumps used to pump the produced water down hole are adversely affected by this watery solution of corrosive, oily sludge.

It has been demonstrated that the judicious dissolution of an appropriate concentration of ozone gas into produced water prevents the proliferation of a broad spectrum of microbiological life forms.

In addition to the above-referenced benefit of disinfection, the oxidative capacity of ozone is also potent enough to "break" the emulsification of crude oil in produced water. The crude oil thus liberated from the produced water floats to the surface of the water and is recovered by conventional means (while traveling through this series of tanks known as the battery.) The combination of ozone gas and centrifugal separation can also enhance and expedite this transaction. The solids formerly held in suspension are precipitated to the bottom of the pit or tanks as the produced water is conveyed from the vacuum tanks through the tank battery to the high pressure pump. The produced water, unencumbered by the presence of crude oil and worthless sludge, free of microbiological infestation and the harmful byproducts of their metabolic processes, is now a relatively clear solution that can be reused or safely pumped to its destination with reduced detrimental effects on the equipment and the subterranean formation.

When the process described herein below is applied to produced water, the administration of ozone gas into the produced water is for the purpose of conditioning the produced water to a state suitable for efficient sustainable disposal, if not otherwise used deemed suitable for reuse or human consumption, and enhancement of the crude oil that is often gathered to bring it to a quality that will bring a higher price allowing its designation as a "sweet" rather than a "sour" oil.

The first portion of the system comprises a series of settling tank system 202. The settling tanks 202 include a number of separate compartments that are separated by baffles illustrated generally at 204. A vacuum truck 206 from an oil or gas well site connects with the tank system 202 to pump the untreated or produced water into a compartment 210 as indicated generally at 208. The water provided may also comprise other types of untreated water. Additionally, into compartment 210 an acid feed mechanism 212 injects an acid solution into the water to be treated to assist in breaking down solids within the water. The water pumped into compartment 210 is allowed to flow through the baffles 204 into compartment 214 and compartment 216.

Figure 3:
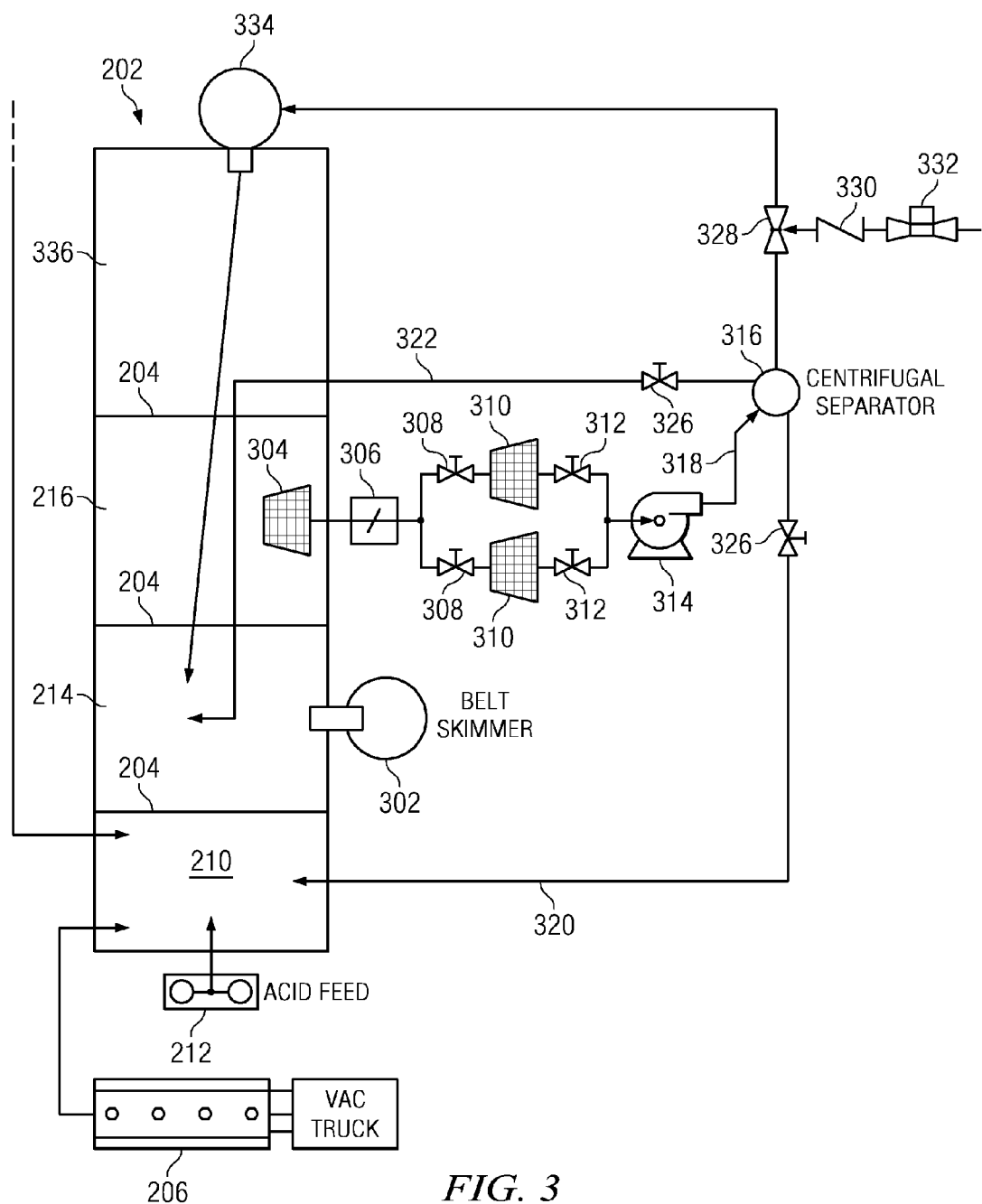
FIG. 3 illustrates the centrifugal separators in conjunction with the settling tanks used for creating the purified water according to the present disclosure.

Referring now also to FIG. 3, there is more fully illustrated the tank system 202 and associated compartments. As described previously, produced water from the vacuum truck 206 is pumped into the chamber 210 of the tanks 202. Water flows through the baffles 204 into chamber 214 and finally into chamber 216. Flow of the water between the chambers is facilitated by displacement as water comes into the pit or closed tank from the vacuum trucks. The oil/water separator 302 is utilized to capture sour oil to be more heavily "Ozonated" to sweeten it by oxidizing the sulfurous substances when appropriate.

Fluid from the chamber 216 is drawn through the four inch coarse strainer 304. The strained fluid comes through a check valve 306, and the flow is divided through two ball valves 308. After passing through the ball valves 308, the flow in each of the pathways passes through two-inch basket strainers 310. The flow next passes through another pair of ball valves 312 to a centrifugal separator pump 314. The centrifugal separator pump 314 provides the suction forces for drawing the water to be treated from compartment 216 into the strainer 304. In a preferred embodiment, the centrifugal pump 314 comprises a ten horse power self-priming centrifugal pump. The centrifugal separator pump 314 pumps the strained fluid into a centrifugal separator 316 as will be more fully described hereinbelow. In the embodiment in FIG. 2, the fluid is pumped directly from the centrifugal separator pump 314 into the centrifugal separator 316. However, along the pathway 318 in an alternative embodiment, a venturi nozzle may be inserted to facilitate the injection of ozone into the fluid flow from the pump 314 to the centrifugal separator 316.

Figure 4:
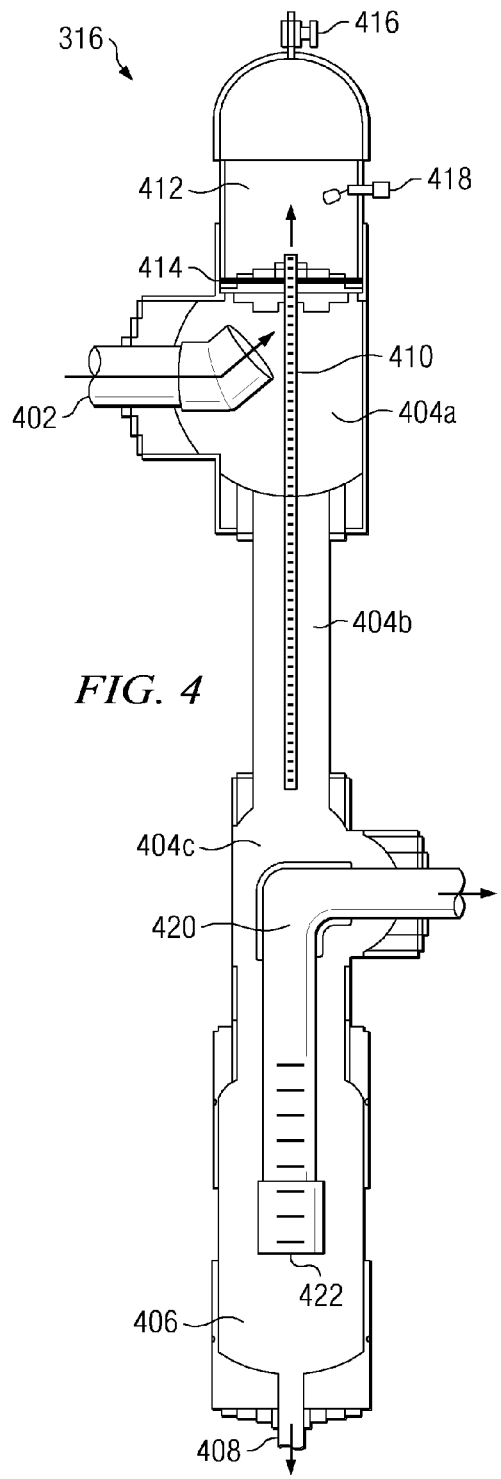
FIG. 4 provides a cutaway side view of the centrifugal separator.

Once pumped into the centrifugal separator 316 bulk oil, saline water and large solids within the fluid are separated from each other responsive to the action of the centrifugal separator 316 as will be more fully described with respect to FIG. 4. The centrifugal separator 316 separates solids from the water and injects the solids back into compartment 210 along pathway 320. Bulk oil that is removed from the water is injected back into compartment 214 via pathway 322. Each of the removed bulk oil and removed solids pass through an associated check valve 326. The remaining saline water is removed from the centrifugal separator 316 and passes through a Mazzei or venturi nozzle 328. The venturi nozzle 328 is used for injecting ozone into the water stream that is passing from the centrifugal separator 316. The ozone is provided to the venturi nozzle 328 along pathway 330 through nozzle 332. The components for generating the ozone that is injected along pathway 330 will be more fully described hereinbelow. The ozone injected water passes through a second centrifugal separator 334 before the water is injected back into chamber 336 of the tanks 202.

Referring now to FIG. 4, there is more fully illustrated a cutaway diagram of the centrifugal separators 316, 334 that are utilized within the present disclosure. The ozonated or non-ozonated water is injected into the centrifugal separator 316 at an inlet pipe 402. The inlet pipe 402 injects the water into an upper interior chamber 404a of the centrifugal separator 316 that is substantially circular. The inlet pipe 402 injects the water along the periphery of the interior chamber 404 such that the pressurized water entering via the inlet 402 will swirl about a central axis of the centrifugal separator in a circumlinear fashion. This injected water from the inlet 402 will cause additional fluids that are already contained within the interior chamber 404 to likewise swirl about the axis of the centrifugal separator 316 in a circumlinear fashion. This rotation of water within the centrifugal separator 316 will cause the centrifugal forces generated by the swirling waters to separate solids, gasses, oil and water from each other within the centrifugal separator 316.

The interior chamber 404 includes an upper portion 404a where the initial water stream is initially injected via the inlet pipe 402. Immediately below the upper portion 404a is a middle portion of the interior chamber 404b. The middle portion 404b has a diameter that is smaller than the diameter of the upper portion 404a. This decrease in diameter between the upper portion 404a and the middle portion 404b will cause the swirling action of the water within the centrifugal separator to increase due to the restriction of the swirling water within the smaller diameter middle portion 404b. The swirling actions within the upper portion 404a and the increased swirling action within middle portion 404b will cause the separation of large suspended solids, saline water and bulk oil from one another. The centrifugal forces will cause the heavy solids to migrate to the outer walls of the separator due to the swirling fluid while the oils will migrate to the center zone of the swirling fluid and the saline water will migrate to the zone between the oil and solids. The separated solids are channeled to the bottom portion 404c of the interior chamber due to the swirling motion of the water mixture. The separated solids which are channeled to the bottom portion 404c are removed from the bottom of the centrifugal separator 316 via an outlet port 408. The solid materials removed from the outlet 408 are channeled back to the chamber 210 of the tanks 202 as described previously.

The separated bulk oil and gasses will exit the upper interior chamber portion 404a and middle interior chamber portion 404b via a perforated pipe 410 running through the center of these chambers. The removed bulk oil and gasses pass through perforations within the perforated pipe 410 and pass up through the perforated pipe 410 into an upper storage chamber 412. The upper storage chamber 412 may be used for storing the removed bulk oil and gasses. The upper chamber 412 is separated from the upper interior chamber 404a by a seal 414 which surrounds the perforated pipe 410 and extends all the way out to the interior walls of the centrifugal separator 316. The removed bulk oil and gasses may be removed from the upper chamber 412 via solenoid valve 416. A Float Switch 418 activates solenoid valve 416 to vent the accumulated gases.

An outlet pipe 420 is used for removing the separated saline water that passes to the lower chamber 404c. The outlet pipe 420 enters the centrifugal separator at a right angle to the main axis of the centrifugal separator 316 and then turns at a right angle to follow the long axis of the centrifugal separator 316. An opening 422 at the bottom of the outlet pipe 420 enables water to flow into the outlet pipe 420 from the lower chamber 406 after the saline water has been separated from the bulk oil and suspended solids.

As mentioned previously, ozone may be diffused into the produced water prior to inserting it into the centrifugal separator 316. If the produced water is first passed through the centrifugal separator 316 without the inclusion of ozone, the removed saline water at the outlet port 420 will be partially clean but still containing emulsified oils, salts, minerals and microbiological life forms. This mixture may be mixed with ozone gas before it is subjected to a second centrifugal solid separator prior to being injected back into the tanks 202. The addition of ozone to the solution at this juncture will produce several benefits. Many microbiological life forms will be destroyed by a reaction with the ozone called "lysis." This will prevent biofouling of the progressively stringent filtration processes used to separate small suspended solids, saline water and bulk oil from one another as will be discussed more fully with respect to FIGS. 2 and 5. The ozone also acts as a catalyst, forcing a reaction known as "resolution" of the emulsified oil from suspension in the water. The ozone will also react in an oxidative capacity to precipitate soluble solids such as iron, manganese and silica from the saline water. The precipitated solids will coagulate into particles that will be removed by the filtration stages of the system and/or subsequent centrifugal separation.

The ozonated water mixture of suspended solids, bulk oil and saline water will enter the upper side of the second centrifugal separator and the ozone will mix thoroughly with the water while being subjected to the fluid dynamics of the centrifugal separator. The fluid will be forced to spin as it passes through the centrifugal separator. Centrifugal forces will cause heavier solids to migrate to the outer wall of the swirling fluid and be removed through the lower port 408. The resolved oil will migrate to the center zone of the swirling fluid to be removed through the perforated pipe 410 to the upper chamber 412. The cleaner saline water will migrate to the center zone of the fluid to be removed via the outlet port 420. The separated bulk oil may be utilized as a beneficial byproduct of this process and the oil used for additional oil based processes. The saline water exiting the separator 316 will be further processed to improve its quality.

Figure 5:
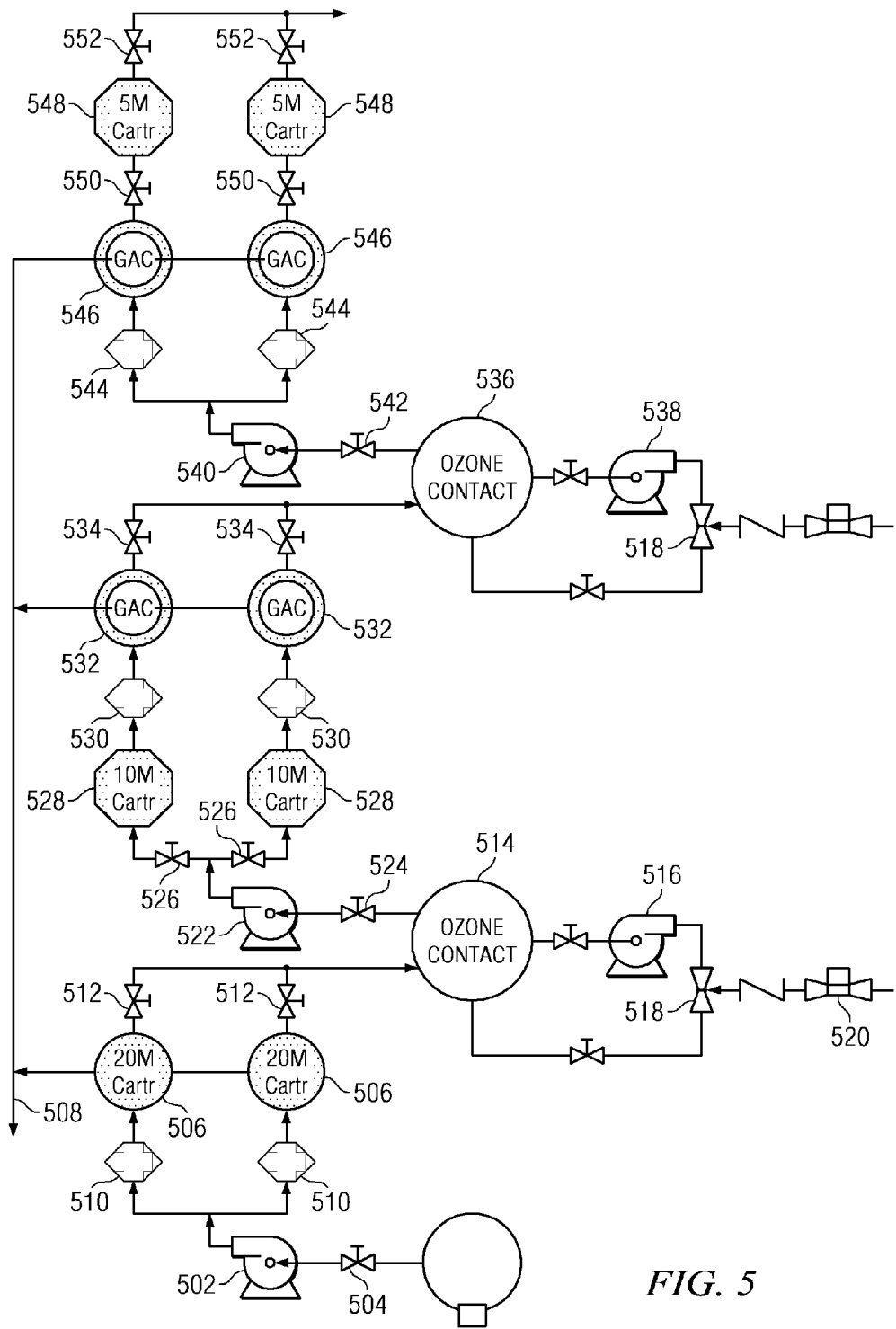
FIG. 5 illustrates the successive filtering mechanisms used for filtering the saline water flowing through the system.

Referring now back to FIGS. 2a-2b, once the produced water has been subjected to the centrifugal separation processes associated with the baffle tanks 202, the removed saline water is then submitted to a series of filtration processes 220 using successively smaller filters in order to remove additional solids and oils from the saline water solution. Referring now to FIG. 5, there is more particularly illustrated the filtration processes for the saline water. The successive filtration system 220 removes oil and other foulants that would damage the nano membranes and RO membranes within the membrane filtration portion 226.

A pump 502 withdraws saline water from the upper chamber 336 of the baffle tanks 202. The pump 502 draws the saline water through a valve 504. This stream of saline water is separated into two parallel streams and run through 20 mm sand filters 506. The particulate and oil matter removed by the 20 mm sand filters 506 are transported back to chamber 210 of the baffle tanks 202 via pathway 508. The saline water passes through backwash valves 510 prior to entering the sand filters 506 to prevent water from reverse flowing through the system. After passing through the 20 mm sand filters, the saline water passes through another set of valves 512 and passes through an ozone contact unit 514.

Ozone contact tank 514 comprises a surge tank for temporarily enabling the storage of saline water when the volume of water temporarily exceeds the amount able to be processed by the system. A portion of the saline water is extracted from the ozone contact chamber 514 by a pump 516. The pump 516 drives the saline water through a venturi nozzle 518 wherein ozone is injected into the saline water provided over a pathway 520. The ozonated saline water is passed back to the ozone chamber 514.

Saline water is drawn from the chamber 514 by a pump 522 through a valve 524. The pump forces the saline water through the ball valves 526 by parallel pathways. The two parallel streams are driven through 10 mm cartridge filters 528. The filtered saline water leaves the 10 mm cartridge filters 528 and passes through backwash valves 530 and is filtered again by a GAC filter 532. The GAC filter comprises a granular activation carbon absorption filter. The solid and oil materials removed by the GAC filters 532 are passed back to the baffle tanks 202 via path 508.

The filtered water next passes through valve 534 into a second ozone contact chamber 536, which comprises another surge tank. This ozone contact surge tank 536 operates in a similar manner to that described previously wherein a pump 538 pumps water from the ozone contact surge tank 536 and passes the water through a venturi nozzle 518 to inject ozone into the water and provides the ozone injected saline water back into the surge tank 536. A pump 540 pumps water from the ozone contact surge tank 536 through a valve 542 and provides this pumped water through a pair of backwash valves 544 to a pair of GAC filters 546. The materials filtered by the GAC filters 546 are provided back to the lower chamber 210 of the baffle tank 202 via pathway 508. The water passes from the GAC filters to a pair of 5 mm cartridge filters 548 through valves 550. The saline water passes through a last pair of valves 552 onto a surge tank 222 illustrated back in FIG. 2.

Figure 6:
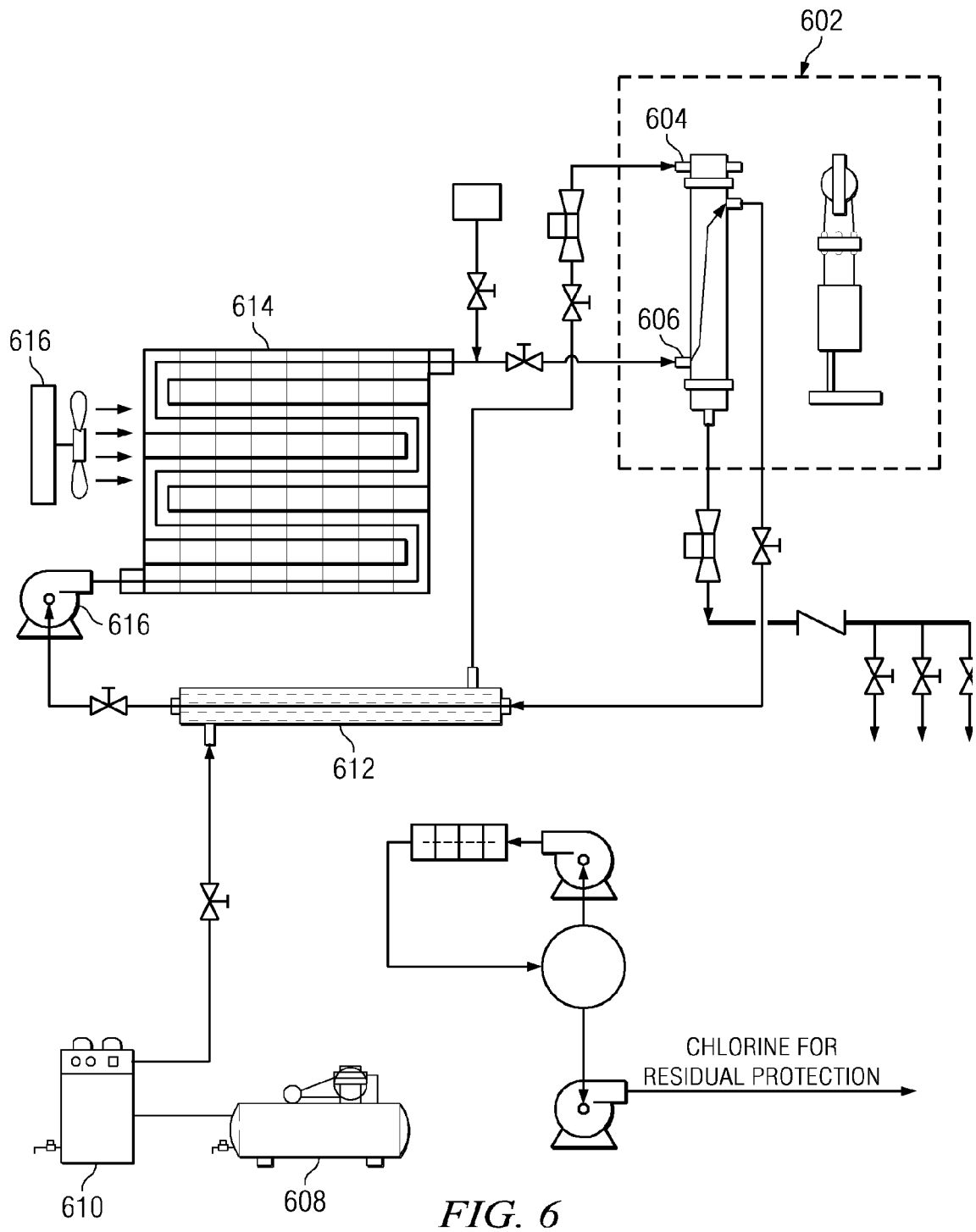
FIG. 6 illustrates the ozone generation system.

Referring now back to FIGS. 2a-2b, the previous description has mentioned several references to the injection of ozone into the water stream that is passing through the system. The ozone is generated by the ozone generation system 224. The ozone generation system 224 would operate in the manner described by U.S. Pat. No. 5,547,644, issued on Aug. 20, 1996 and entitled, "Ozone Generation System," which is incorporated herein by reference. The ozone generation system 224 is more particularly illustrated in FIG. 6. Ozone is withdrawn from an ozone generation module 602. The ozone generation module 602 receives oxygen via an oxygen inlet 604 and receives water through a cooling water inlet 606. The oxygen is provided from an air compressor 608 that injects oxygen to an oxygen concentrator unit 610. The air from the oxygen concentrator unit 610 passes through an air cooler 612 which cools the concentrated oxygen and provides the cooled oxygen to the oxygen inlet 604. Cooling water is received at inlet 606 from a cooling grid 614 that is cooled by a cooling fan 616. The water is pumped into the cooling grid 618 using a pump 616 that draws the water through the air cooler 612. The water flowing through the air cooler 612 cools the oxygen that is being passed through from the oxygen concentrator 610 to the ozone generation module oxygen inlet port 604. The cooled water circulates through the oxygen generation module 602 back to the input of the air cooler 612.

Figure 7:
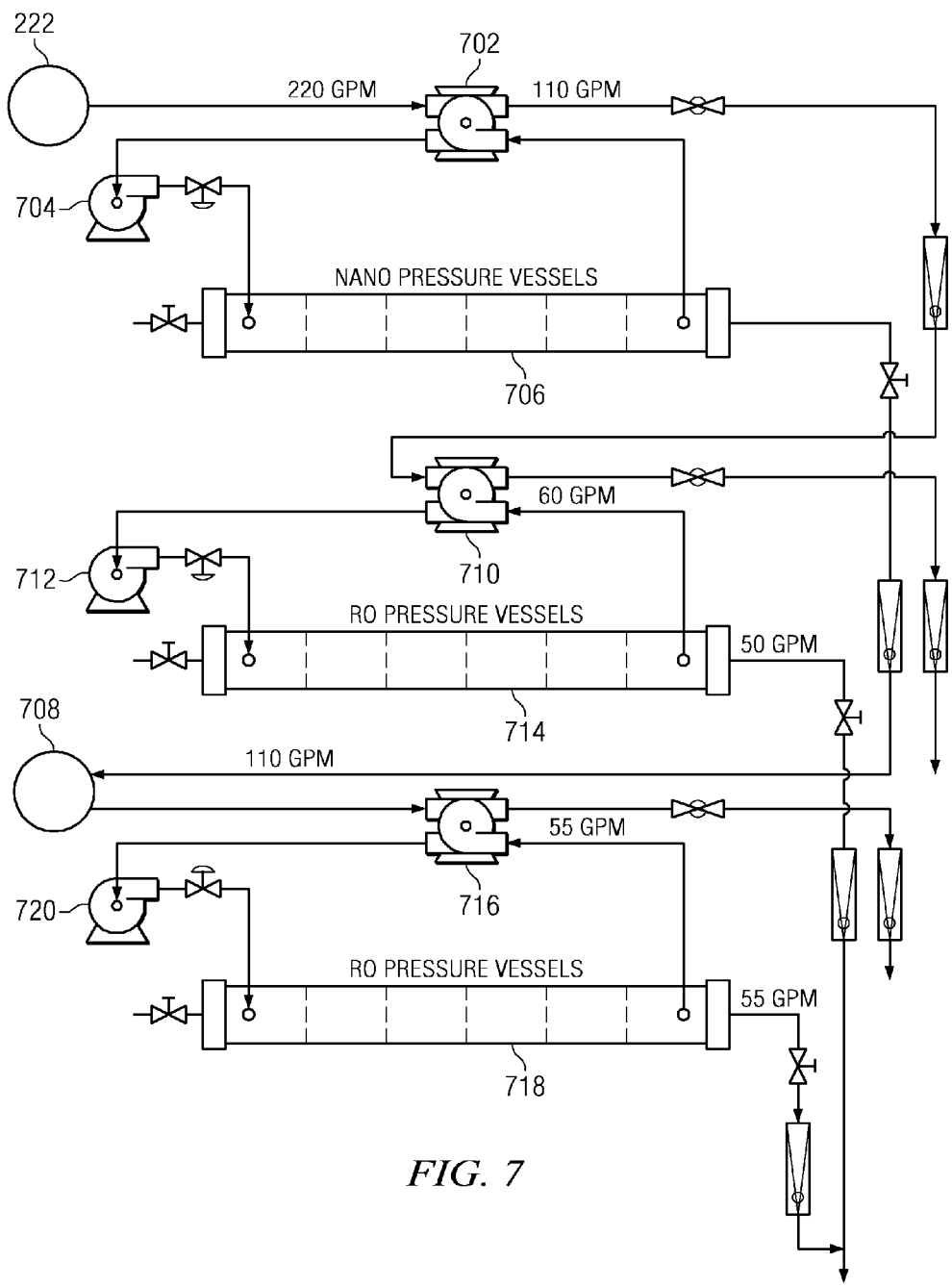
FIG. 7 illustrates the sequentially placed nano vessel filters and reverse osmosis (RO) pressure vessels of the water purification system.

Referring now back to FIGS. 2a-2b and to FIG. 7, once the filtration processes have been completed, the water is temporarily held within a surge tank 222 before passing through a series of filtration membranes contained within series connected pressure vessels 226. The saline water leaves the surge tank 222 at 220 gal/min through energy recovery module 702. The saline water passes at 220 gal/min from the energy recovery module to a booster pump 704 to an input of the nano pressure vessels 706.

The nano pressure vessels 706 are used for removing the hardness minerals from the saline water in order to protect the RO membranes within the RO pressure vessels 714 and 718. The nano pressure vessels 706 include six pressure vessels containing eighteen nano membranes. The nano membranes are used for filtering hardness minerals from the saline water that is passing through the nano pressure vessels 706. Once the saline water has been filtered by the membranes, it exits the nano pressure vessels through two separate streams. The Nano and RO membranes are arranged—six 8"×40" membranes per pressure vessel and the flow across the membranes is more of a "parallel" simultaneous flow from the High pressure "concentrate" side of the membrane to the low pressure "permeate" side of the membrane. One stream leaves via an output port and passes back through the energy recovery module 702 at 110 gal/min. The other stream of saline water leaves the nano pressure vessels at 110 gal/min and is deposited in another surge tank 708.

The first stream of saline water filtered by the nano pressure vessels 706 is passed through a second energy recovery module 710 and a booster pump 712 to the input of a first group of RO (reverse osmosis) pressure vessels 714. The RO pressure vessels consist of a series of two pressure vessels containing ten RO membranes and are used for desalinating the water. The saline water after being filtered by the series of ten RO membranes exits via two separate water streams. A first stream from RO pressure vessel 714 passes back to the energy recovery module 710 at approximately 60 gal/min and is output to a 60 gal/min tank 228 illustrated in FIG. 2. The 60 gal/min tank 228 contains low quality, high salt saline water. The second output of the RO pressure vessels 714 is provided as a 50 gal/min output to a 110 gal/min surge tank 232 that provides a high quality, low salt saline water solution.

The surge tank 708 provides an output to a third energy recovery module 716 that provides an input to a second group of RO pressure vessels 718 through a booster pump 720. The RO pressure vessels 718 consist of two pressure vessels containing ten RO membranes. The filtered output of the RO pressure vessels comprises a 55 gal/min stream of saline water that is provided to a 110 gal/min surge tank 232. The outputs of each of the RO pressure vessels 714 and 718 are provided to this tank which provides a high quality, low salt saline solution (high quality brine). The second stream of the water from RO pressure vessel 718 passes out at 55 gal/min back through the energy recovery module 716 and is provided to surge tank 230 containing a high quality, high salt saline solution. The high quality, high salt surge tank 230 and the high quality, low salt surge tank 232 may be connected with a chlorine production system 234 that is used for producing chlorine for the water to provide residual protection.

Once this treatment process has been completed, the filtered water will reside within the various surge tanks 228, 230 and 232. The removed solids will be in the compartment 210 of the tank system 202 and removed oil will be located with compartment 214 of the tank system 202. The removed saline water may in some situations be potable and useful for irrigation or human consumption. The removed oil can be of such a quality that it could be sold to buyers of crude oil. Additionally, the removed water could be placed down hole within an existing well or used for capping wells using the high quality brine solution. The water could additionally be used for fraccing solutions within oil well production. The described process will enable the recovery of 40-50% of the water that was previously required to be injected down hole after the oil production process.

Figure 8A:
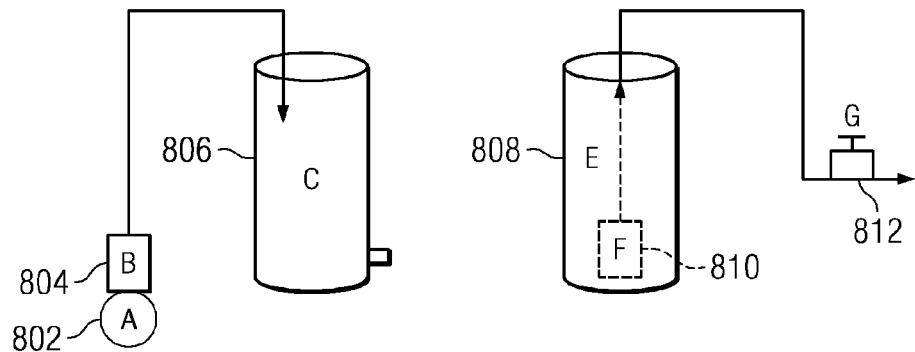
FIGS. 8a and 8b illustrate one manner in which the water purification system of the present disclosure may be utilized to provide purified water to remote villages and towns.
Figure 8B:
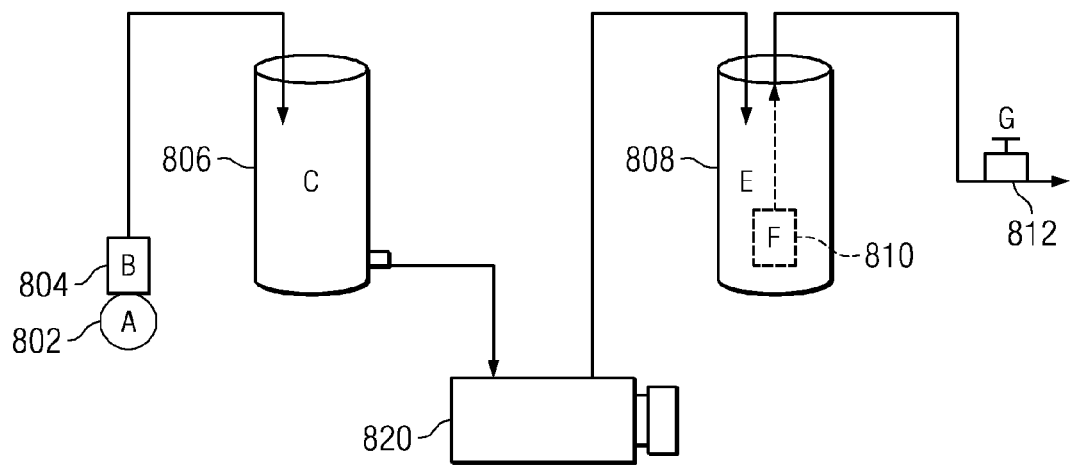

Referring now to FIGS. 8A and 8B, there is illustrated a manner in which the system described with respect to FIG. 2 may be utilized to provide treated water within remote regions using a portable version of the system described with respect to FIGS. 2a-2b. FIG. 8A illustrates the fixed portions of the system that remain within a town or village. A source of water to be treated 802 may comprise production water from a well or some other type of contaminated water source. A solar powered supply pump 804 pumps water from the source of water 802 into a storage tank 806. The storage tank 806 stores the water that is to be treated prior to its connection to a mobile treatment system as described in FIGS. 2a-2b. The storage tank 806 would comprise the tank system 202 or some differing configuration thereof that would contain the water to be treated. A storage tank for treated water 808 comprises the tank for storing water that has been treated by a mobile version of the system of FIGS. 2a-2b. Associated with the tank 808 is a solar powered distribution pump 810 that is used for pumping water from the treated water tank 808 to a distribution control valve 812 that is used for distributing the water for irrigation or human consumption. While the use of solar powered pumps has been described, other types of pumps may of course be utilized wherein the pumps are powered by gasoline, electricity, wind power, etc. The tanks 806, 808, pumps 804, 810 and distribution valves 812 along with associated piping are located in place at the town or village. This allows the storage tank 806 to be full when the mobile system arrives at the town or village and enables treated water from tank 808 to be distributed to areas of somewhat higher elevation.

Referring now to FIG. 8B, once the mobile water purification system 820 is transported to the town or village, the system is connected between the storage tank 806 containing the water to be treated and the storage tank 808 for storing treated water coming from the system. The system 820 receives the water to be treated out of tank 806 and treats the water using the components described previously with respect to FIGS. 2a-2b. The treated water is output from the system and into the storage tank 808. The mobile water treatment system includes sufficient electrical power to supply auxiliary systems such as lighting or audio/visual equipment that can assist in educational efforts when the system is operated by someone who is prepared to address the educational needs of the towns and villages.

Figure 9:
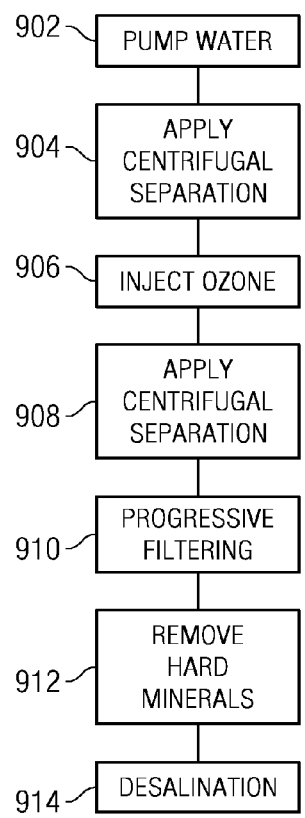
FIG. 9 is a flow diagram describing the operation of the system of FIG. 2.

Referring now to FIG. 9, there is illustrated a flow diagram describing the operation of the system of FIGS. 2a-2b. Initially, at step 902, water is pumped into the water treatment system to begin processing of, for example, production water from an oil and gas well. The pumped water is applied to a first centrifugal separation process at step 904 wherein centrifugal forces cause the separation of solids, oil and gasses and saline water within the water that has been pumped into the system. The centrifugal separation process will effectively separate the solids, oils and gasses from the saline water. The saline water is further treated with the injection of ozone at step 906. The injection of the ozone enables the partially clean saline water to further precipitate solids from the saline water solution and to kill some types of microbiological life forms within the water using a lysis process. The ozone may also act using the process of resolution to cause emulsified oils within the saline solution to be broken down into a form that may be removed via further centrifugal separation or other types of filtering processes.

The ozonated saline solution is next applied to a second centrifugal separation process at step 908. This will cause the precipitated solids, emulsified oils, additional gasses and saline solution to be further separated from each other. The precipitated solids, emulsified oils and gasses may then be separated from the saline water solution in a manner similar to that done at step 904. Following the second centrifugal separation process, a progressive filtering process may be carried out at step 910 from larger to smaller filters in order to progressively remove smaller size particles from the saline solution. Next, at step 912, the saline water is submitted to a nano filtration in order to remove hard minerals from the saline solution. The removal of the hard minerals will assist in the operation of the desalinization process at step 914 wherein reverse osmosis filters are used to desalinate the saline solution. The removal of the hard minerals by the nano filters assists in this process in that the hard minerals which can negatively affect the operation of the reverse osmosis filters within the desalinization process are removed from the water.

The disclosed system comprises a system for water quality enhancement. The system comprises a means for oxidizing organic substances in the water input to the system, the means also disinfecting the water by destroying parasites and bacteria and inactivation viruses in the water and further causing coagulation of colloids in the water. The system can be additionally used for crude oil quality enhancement where sufficient qualities of crude oil are present within produced water being processed. Thus, produced water solutions from oil and gas wells may be processed to make a significant portion of said water more suitable for disposal by deep well injection and to facilitate the increased recovery of a higher quantity of bulk crude oil with said recovered bulk crude oil being a lighter, sweeter crude, rather than is presently practiced from produced water solutions.

It will be appreciated by those skilled in the art having the benefit of this disclosure that this water purification system and method provides an improved treatment of contaminated water from, for example, well production. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An apparatus for purifying produced water to make said water potable, comprising:
    an intake pump for bringing produced water into said apparatus;
    at least one ozone contact chamber for injecting ozone into the produced water being injected into at least one of the at least one centrifugal separator;
    a centrifugal separator for receiving ozone injected produced water from the at least one ozone contact chamber and mixing the injected ozone with the produced water, the mixing of the injected ozone with the produced water in the centrifugal separator destroying microbiological life forms within the ozone injected produced water, acting as a catalyst for a resolution process to resolve emulsified oil from suspension in the produced water, and precipitating soluble solids from the produced water, the centrifugal separator further separating the ozone injected produced water into the precipitated soluble solids, the resolved emulsified oils and the produced water;
    a series of progressive filtration components providing multiple levels for progressively filtering the produced water from the at least one centrifugal separator, each of the multiple levels filtering a smaller level of particles from the produced water than a preceding level, wherein the series of progressive filtration components further comprises:
        a second intake pump for bringing said produced water into said filtration components;
        a first filter, connected to said intake pump, said produced water passing through and being filtered by said first filter;
        a second ozone contact chamber, connected to said first filter, said produced water passing through said second ozone contact chamber and being contacted with ozone in said second ozone contact chamber;
        a second filter; connected to said second ozone contact chamber, said produced water passing through and being filtered by said second filter;
        a first granular activated carbon filter, connected to said second filter, said produced water passing through said first granular activated carbon filter;
        a third filter, connected to said first granular activated filter, said produced water passing through and being filtered by said third filter;
        a second granular activated carbon filter, connected to said third filter, said produced water passing through said second granular activated carbon filter; and
        a fourth filter, connected to said second granular activated carbon filter, said produced water passing through and being filtered by said fourth filter; and
    desalination filters for desalinating said progressively filter produced water.

2. The apparatus of claim 1, further comprising:
    a first centrifugal separator, prior to the at least one ozone contact chamber for receiving the produced water from the intake pump and separating the produced water into larger portions of the suspended solids, saline water and a portion of the oil.

3. The apparatus of claim 1, wherein the desalination filters further comprises:
a nano filtration unit for filtering hard minerals from the produced water from the series of progressive filtration components; and
at least one reverse osmosis filter for removing salt from the produced water from the nano filtration unit.

4. The apparatus of claim 1 further including a chlorine contact chamber located after the desalination filters, said produced water passing through said chlorine contact chamber and being contacted with liquid chlorine in said chlorine contact chamber.

5. An apparatus for purifying produced water to make said water potable, comprising:
an intake pump for bringing produced water into said apparatus;
a first centrifugal separator for receiving the produced water from the intake pump and separating the produced water into larger portions of suspended solids, saline water and a portion of included oil;
a first ozone contact chamber for injecting ozone into the saline water from the first centrifugal separator;
a second centrifugal separator for receiving ozone injected saline water from the first ozone contact chamber and mixing the injected ozone with the saline water, the mixing of the injected ozone with the saline water in the centrifugal separator destroying the microbiological life forms within the ozone injected saline water, acting as a catalyst for a resolution process to resolve emulsified oil from suspension in the saline water, and precipitating soluble solids from the saline water, the centrifugal separator further separating the ozone injected saline water into the precipitated soluble solids, the resolved emulsified oils and the saline water;
a filtering system for filtering additional components from the saline water, wherein the filtering system further comprises:
a series of progressive filtration components for progressively filtering the saline water from the at least one centrifugal separator;
wherein the series of progressive filtration components further comprises:
a second intake pump for bringing said saline water into said filtering system;
a first filter, connected to said intake pump, said saline water passing through and being filtered by said first filter;
a second ozone contact chamber, connected to said first filter, said saline water passing through said second ozone contact chamber and being contacted with ozone in said second ozone contact chamber;
a second filter; connected to said second ozone contact chamber, said saline water passing through and being filtered by said second filter;
a first granular activated carbon filter, connected to said second filter, said saline water passing through said first granular activated carbon filter;
a third filter, connected to said first granular activated filter, said saline water passing through and being filtered by said third filter;
a second granular activated carbon filter, connected to said third filter, said saline water passing through said second granular activated carbon filter;

a fourth filter, connected to said second granular activated carbon filter, said saline water passing through and being filtered by said fourth filter; and
desalination filters for desalinating said progressively filtered saline water.

6. The apparatus of claim 5, wherein the filtering system further comprises:
a series of progressive filtration components for progressively filtering the saline water from the at least one centrifugal separator; and
desalination filters for desalinating said progressively filtered saline water.

7. The apparatus of claim 5, wherein the desalination filters further comprises:
a nano filtration unit for filtering hard minerals from the saline water from the series of progressive filtration components; and
at least one reverse osmosis filter for removing salt from the saline water from the nano filtration unit.

8. The apparatus of claim 5 further including a chlorine contact chamber located after the desalination filters, said water passing through said chlorine contact chamber and being contacted with liquid chlorine in said chlorine contact chamber.

9. An apparatus for purifying produced water to make said water potable, comprising:
an intake pump for bringing the produced water into said apparatus;
a first centrifugal separator for receiving the produced water from the intake pump and separating the produced water into larger portions of suspended solids, saline water and a portion of oil;
a first ozone contact chamber injecting ozone into the saline water from the first centrifugal separator;
a second centrifugal separator for receiving ozone injected saline water from the first ozone contact chamber and separating the ozone injected saline water into the precipitated suspended solids, the oil and the saline water;
a series of progressive filtration components providing multiple levels for progressively filtering the saline water from the at least one centrifugal separator, each of the multiple levels filtering a smaller level of particles from the saline water than a preceding level, wherein the series of progressive filtration components further comprises:
a second intake pump for bringing said saline water into said filtering system;
a first filter, connected to said intake pump, said saline water passing through and being filtered by said first filter;
a second ozone contact chamber, connected to said first filter, said saline water passing through said second ozone contact chamber and being contacted with ozone in said second ozone contact chamber;
a second filter; connected to said second ozone contact chamber, said saline water passing through and being filtered by said second filter;
a first granular activated carbon filter, connected to said second filter, said saline water passing through said first granular activated carbon filter;
a third filter, connected to said first granular activated filter, said saline water passing through and being filtered by said third filter;
a second granular activated carbon filter, connected to said third filter, said saline water passing through said second granular activated carbon filter; and a fourth filter, connected to said second granular activated carbon filter, said saline water passing through and being filtered by said fourth filter; and desalination filters for desalinating said progressively filter saline water.

* * * * *